May 11, 1937.  E. T. BYSSHE ET AL  2,080,303
CIRCULAR CHASER AND MOUNTING THEREFOR
Original Filed Nov. 24, 1933
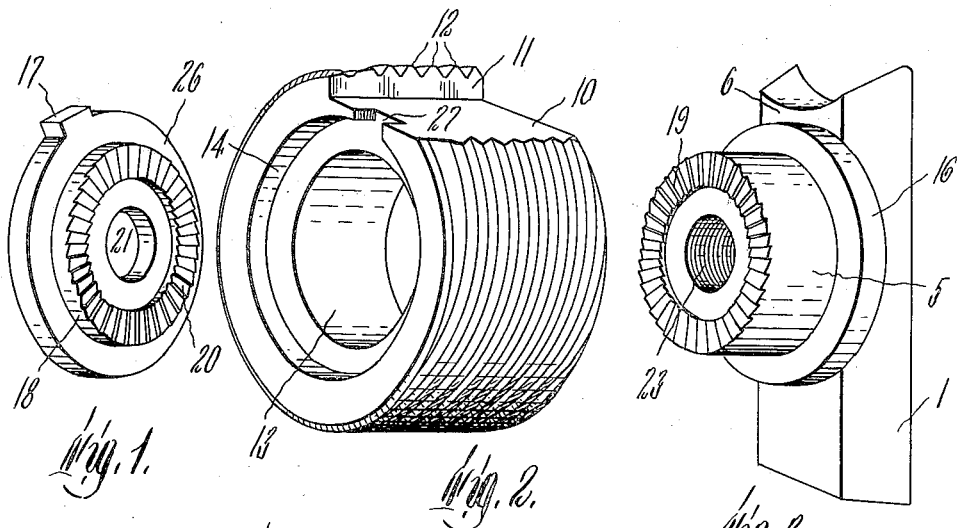
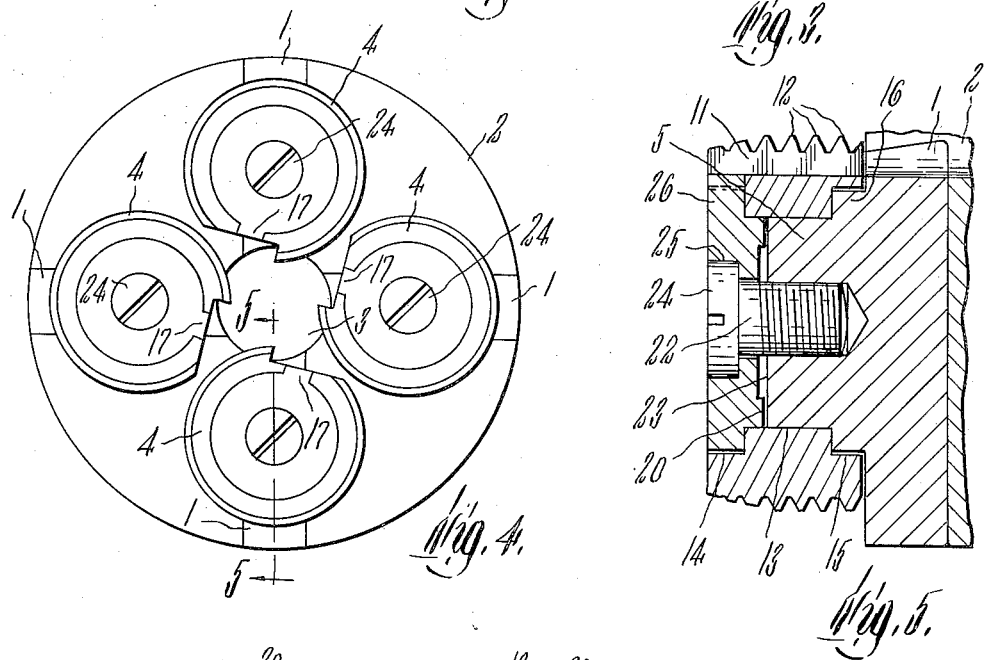
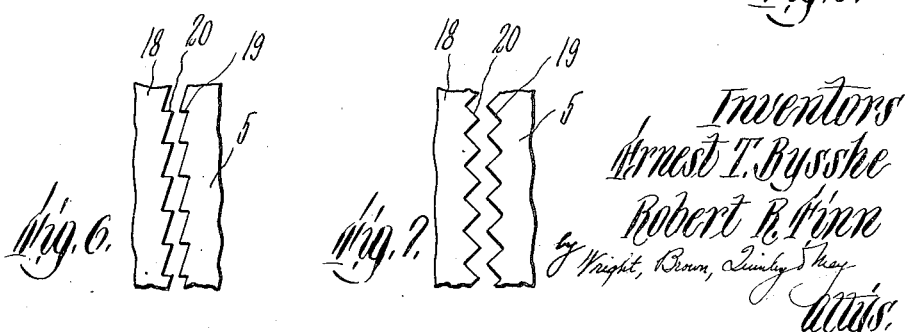
Inventors
Ernest T. Bysshe
Robert R. Vinn Patented May 11, 1937

2,080,303

UNITED STATES PATENT OFFICE 2,080,303

CIRCULAR CHASER AND MOUNTING THEREFOR

Ernest T. Bysshe and Robert R. Finn, Springfield, Vt., assignors to Jones & Lamson Machine Company, Springfield, Vt., a corporation of Vermont Original application November 24, 1933, Serial No. 699,550. Divided and this application August 19, 1935, Serial No. 36,801

8 Claims. (Cl. 10—103)

This invention relates to chasers of the circular type and to their mountings and has for an object to provide an improved cooperating chaser and mounted by which accurate sharpening of the chaser and replacement on the die is facilitated and by which the chaser itself may be made of simple construction, reducing its cost.

To this end, the chaser is located definitely with relation to a locating piece which in turn can be positioned relative to the chaser holder in any selected of a large number of angular positions, each differing from its adjacent position by a definite angular extent. Thus, it is only necessary to remove at each sharpening operation an amount of stock to a definite angular position corresponding to one such increment to ensure the return of the cutting edges to correct relation to the work when the chaser is replaced provided that initially the cutting edges were correctly positioned.

This application is a division of our application Serial No. 699,550, filed November 24, 1933, for "Circular chaser and method of making the same".

For a more complete understanding of this invention, reference may be had to the accompanying drawing in which Figure 1 is a perspective of a chaser clamping plate.

Figure 2 is a perspective of the chaser.

Figure 3 is a perspective showing a mounting block and its stud for receiving the chaser of Figure 2 and the plate of Figure 1.

Figure 4 is a front elevation of a die showing a set of four chasers thereon.

Figure 5 is a detail section to a larger scale on line 5—5 of Figure 4.

Figures 6 and 7 are detail elevations showing two forms of engaging serrations between the chaser clamping plate and locating stud.

Referring to the drawing, at 1 is shown a chaser support which is formed as a block slidably mounted in the die 2 (see Figure 4) and usually formed dovetail in cross section. There are as many of these blocks as there are chasers in a set, commonly there being four such chasers, the blocks then being four in number and being mounted for movement radially with reference to the end face of the die 2, as shown in Figure 4.

The die is provided with a central opening 3 for the passage of the work between the chasers which are indicated at 4. The sliding of the blocks 1 controls the opening and closing of the die, it being understood that when in operative closed position the cutting teeth of the chasers are spaced properly to cut threads in the work to the desired depth. As shown each block 1 is provided with an outwardly extending locating stud 5. The chaser 4, of circular outline, is provided with an arcuate portion 10 cut away to form on one side an upstanding wall 11 which forms one end face of each of a series of thread ridges 12, those at the forward or outer end of the chaser being the thread cutting ridges and those in the remainder acting as guiding ridges to feed the chaser onto the work.

Each chaser is shown as formed with a central circular opening 13 fitting over the locating stud 5. As shown this opening 13 is counterbored at opposite ends as at 14 and 15. The counterbored portion 15 is arranged to take over a circular flange 16 at the base of the locating stud 5, this circular flange extending laterally beyond the side edges of the block and across the forward face of the die. This extended flange portion may bear on the front face of the die. The counterbored portion 14 receives a clamping plate 26 which is of a size to fit therein and in order to prevent relative rotation between the chaser and this plate the two are provided with complemental interengaging portions. As shown these comprise a slot 27 in the chaser extending outwardly from the counterbored portion 14 and a mating lug 17 extending outwardly from the circular periphery of the plate 26.

Means are also provided for preventing relative rotation between the plate 26 and the locating stud 5 thus to lock the chaser against angular motion thereon when it is set in proper angular relation to present the ends of the ridges at 12 to the work. Chasers of the circular type are sharpened by grinding off the face 11 so as to extend the cut away portion 10 and to present new end faces of the thread ridges to the work. It is thus necessary that provision be made for angularly adjusting the chasers with reference to their locating studs after each grinding operation. In accordance with the present invention this is accomplished by providing the end of each locating stud 5 and a cooperating annular rib 18 on the locating plate with mating serrations 19 and 20. This construction provides for assembling the clamping plate 26 with reference to the locating stud in any selected of a multiplicity of angular relations spaced from each other by increments determined by the size of the serrations intermediate which increments it is impossible to clamp the plate to the locating stud. The plate 26 is shown as provided with a central opening 21 to receive a clamp screw 22, the threaded end of which engages in a threaded socket 23 in the end of the locating stud, and in order that there may be no obstructions on the outer end of the chaser so that the chaser may work up close to a shoulder on work, the head 24 of the clamp screw may be seated in a counterbored portion 25 of the opening 21.

By providing for the multiplicity of the angular clamping relations between the chaser and the stud by means located on the stud and on the clamping plate rather than on the chaser, the chaser itself need be provided only with a very simple means for determining its location. This is important for the reason that the chasers have to be renewed as they become used up from wear and successive grindings, while the plate 26 and the stud end are permanent parts, so that the serrations when once made are permanently useful, while the chaser itself need only be provided with the slot 16 which is a very simple matter to form therein. Furthermore, the chaser, being a cutting tool, must be of a hard material suitable for its work and in which machining operations are relatively difficult. The clamping plate may be made of more easily machinable stock.

The teeth of the serrations may be abrupt on one face and sloping on the other, as shown in Figures 1, 3, and 6, or they may be otherwise formed as, for example, equally sloping in opposite directions as shown in Figure 7. It is deemed preferable, however, in most instances to form them with abrupt faces on one side for the reason that when so formed the abrupt faces in engagement with each other may be made to take the thrust occasioned by the pressure between the chaser and the work which tends to rotate the chaser about the axis of the locating stud. With such abrupt shoulders there is no component of this thrust which acts to displace the parts axially.

This securement of the chasers in any selected angular position, these positions being spaced from each other by definite increments, provides a measure to determine the exact amount to which the thread ridges should be cut back at each sharpening operation, so that when the chaser is returned to the die the active ends of these ridges shall be properly positioned with reference to the work to cut threads therein. The proper position of the end face having once been determined for one angular operative position of the chaser, the other positions after grinding operations will be spaced from the first by the angular distance between the successive increments.

From the foregoing description of certain embodiments of this invention, it should be evident to those skilled in the art that various changes and modifications might be made without departing from the spirit or scope of this invention as defined by the appended claims.

We claim:—

1. In combination, a support having a locating stud projecting therefrom, a circular chaser having an opening to receive said stud, a clamping plate engageable with the outer face of said chaser and said stud, said plate and chaser and said plate and stud having complemental portions for locating them relatively in any of a plurality of angular positions angularly spaced by definite increments, and means for securing said plate to said support to clamp said chaser to said support.

2. In combination, a support having a locating stud projecting therefrom, a circular chaser having an opening to receive said stud, a clamping plate, said plate and chaser having cooperating parts limiting said plate and chaser for operative engagement in a single angular relation, said plate and stud having cooperating parts permitting assembly thereof in any selected of a plurality of different angular relations spaced from each other by definite intervals corresponding to the extent of the material removed in successive wear and grinding operations intermediate which said engagement is prevented, and means for securing said chaser, plate and stud together.

3. In combination, a support having a locating stud projecting therefrom, a circular chaser having an opening to receive said stud, said opening being counterbored adjacent to the outer face of said chaser, a clamping plate seated in said counterbored portion, interengaging means on said plate and chaser for preventing relative angular motion thereof from a single relative position, interengaging serrations on said plate and stud for holding said plate against rotation relative to said stud, and a clamp screw extending through said plate and into said stud for securing said plate, chaser and stud together.

4. In combination, a support having a locating stud projecting therefrom, a circular chaser having an opening to receive said stud, said opening being counterbored adjacent to the outer face of said chaser, a clamping plate seated in said counterbored portion, interengaging means on said plate and chaser for preventing relative angular motion thereof from a single relative position, interengaging serrations on said plate and stud for holding said plate against rotation relative to said stud, and a clamp screw extending through said plate and into said stud for securing said plate, chaser and stud together, said serrations having abrupt faces positioned to take the angular thrust between said chaser and work being cut thereby.

5. In combination, a support having a locating stud projecting therefrom, a circular chaser having a circular opening to receive said stud and a single slot extending outwardly from said opening, a clamping plate having a single lug for engagement in said slot to prevent relative turning of said plate and chaser from a single relative angular position, and means for securing said plate to said stud with said chaser between said support and plate in fixed angular relation.

6. In combination, a support having a locating stud projecting therefrom, a circular chaser having a circular opening to receive said stud and a single slot extending outwardly from said opening, a clamping plate engaging the outer face of said chaser having a single lug for engagement in said slot to prevent relative turning of said plate and chaser from a single relative angular position, said plate and support having mating radial serrations to permit angular adjustment by definite space increments between said plate and support and thereby limit the angular adjustment of said chaser relative to said support by such definite angular increments, and means for securing said plate to said support.

7. In combination, a support having a locating stud projecting therefrom, a circular chaser having an opening to receive said stud, a clamping plate engaging the outer face of said chaser and overlying the outer end of said stud, means fixing said plate in definite angular relation to said chaser, and means for securing said plate in position to clamp said chaser to said support, said plate and the end of said stud having cooperating parts defining their relative angular positions when said plate is in clamping relation to said chaser.

8. In combination, a support having a locating stud projecting therefrom, a circular chaser having an opening to receive said stud, a clamping plate engaging the outer face of said chaser, means for fixing said plate to said support with said chaser clamped therebetween, said chaser and plate having parts cooperating to fix their angular relation, and means to determine the angular relation of said plate to said support in any of a plurality of positions differing by successive definite angular increments.

ERNEST T. BYSSHE.
ROBERT R. FINN.